Patented July 27, 1948

2,446,116

UNITED STATES PATENT OFFICE 2,446,116

PROCESS OF PURIFYING CAROTENE CONTAMINATED WITH CHLOROPHYLL AND XANTHOPHYLL

Monroe E. Wall, Oreland, and Edward G. Kelley, Whitemarsh, Pa., assignors to United States of America as represented by the Secretary of Agriculture No Drawing. Application September 8, 1944, Serial No. 553,260

4 Claims. (Cl. 260—666)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a new and useful process for purification of carotene extracts.

In the recovery of carotene from green leaves the latter, preferably dried and powdered, are extracted with a non-aqueous solvent. The preferred solvent is one which will extract the maximum of carotene and the minimum of other substances, especially pigments such as xanthophyll and chlorophyll. Even the best solvents remove some of these pigments. Therefore, the problem is to purify the carotene with respect to chlorophyll and xanthophyll.

For some time it has been known that various homologous or isomeric compounds can be separated by passage of a solution of these compounds in a suitable solvent through a suitable adsorbent. Such a process has been applied to the separation of chlorophylls $a$ and $b$ and to the separation of carotene isomers. However, little or no attempt has been made to separate chlorophyll and xanthophyll from carotene in a practical manner in one operation.

The basis of our invention is the fact that when a solution of carotene, xanthophyll, and chlorophyll in the proper solvent is passed through a column of suitable adsorbent or stirred with this adsorbent, the chlorophyll and xanthophyll are adsorbed more strongly than the carotene. The process of adsorption, as far as is known, is not primarily a chemical one but is a physical reaction, although a chemical reaction may in certain cases take place during the process of adsorption. The separation of carotene from chlorophyll and xanthophyll is due to the difference in chemical configuration of these compounds and has been observed with a wide range of adsorbents.

A suitable adsorbent must not destroy carotene or adsorb it so firmly that it cannot be removed. Adsorbents found suitable for this purpose are neutral or slightly alkaline compounds of calcium, magnesium, and aluminum. Among the suitable materials are lime, hydrated lime, calcium carbonate, secondary calcium phosphate, magnesium oxide, magnesium carbonate, activated magnesia #2641 (a product made in accordance with United States Patents Nos. 2,219,725 and 2,219,726), secondary megnesium phosphate, activated alumina, aluminum oxide, and certain grades of bauxite, a natural aluminum oxide. Acidic compounds, very alkaline compounds and various carbon blacks were found to destroy carotene or to adsorb it so firmly that it could not be removed.

The nature of the solvent has a pronounced effect on the separation of carotene from chlorophyll and xanthophyll. In very non-polar solvents such as petroleum ethers, carotene is easily separated from xanthophyll and chlorophyll with proper adsorbents. With intermediate solvents such as chlorinated compounds, chlorophyll, but not xanthophyll, is removed. With polar solvents such as acetone or alcohol, little or no separation of carotene from xanthophyll and chlorophyll can be attained.

There is also a wide range in the capacity of various adsorbents to remove chlorophyll and xanthophyll before the adsorbent becomes saturated with these compounds. Based on the amount of chlorophyll and xanthophyll a unit amount of adsorbent can remove, activated alumina and activated magnesia #2641 are the most effective, hydrated lime, lime, magnesium carbonate, magnesium oxide, aluminum oxide, and bauxite are intermediate, and calcium carbonate, secondary calcium phosphate and secondary magnesium phosphate are weakest. However, the cost of the activated alumina and magnesia preparations are out of proportion to their increased efficiency in adsorption as compared with intermediate compounds such as hydrated lime which is very cheap and about ⅓ to ⅙ as effective as activated magnesia #2641.

In removing chlorohpyll and xanthophyll from a carotene extract, the solution can be passed through a column of adsorbent and the carotene washed out. Since the proper packing of such a column is a tedious operation, it is more convenient to stir the extract with the proper amount of adsorbent, filter the slurry so formed, and wash from the cake any carotene that may have been adsorbed. The adsorbent may then be reclaimed or discarded.

The adsorbent may be applied directly to the plant extract as it is obtained, or after reducing the volume by concentrating. However, chlorophyll occurs in plant extracts in quantities from 5 to 20 times that of xanthophyll or carotene. As a consequence much more adsorbent must be used than is the case if most of the chlorophyll is first removed by saponification as described in our copending application for patent Serial No. 553,261, filed September 8, 1944, now matured as United States Patent No. 2,394,278, February 5, 1946. Therefore, while untreated plant extracts can be purified by adsorbents, we have found that it is preferable to remove most of the chlorophyll prior to adsorption, thus greatly reducing the amount of adsorbent necessary.

The details of this process are illustrated by the following examples:

EXAMPLE I

Ten pounds of broccoli was extracted with 16 liters of Skellysolve F, a petroleum ether fraction, essentially pentane, boiling between 35° C. and 59° C. and then concentrated to a volume of about 4 liters. A portion of the extract was treated with adsorbent directly. Another portion was saponified with alkaline alcohol as described in our said copending application and, after the saponification products were removed, treated with adsorbent. The adsorption process consisted of stirring the necessary amount of adsorbent in the extract for a few minutes, immediately filtering the slurry and washing the adsorbent cake with fresh solvent until the washings were free from carotene. In some cases the addition of 3 percent to 5 percent acetone or ethanol to the washing solvent is necessary to completely remove the carotene from the adsorbent.

Table 1 shows the purification of the unsaponified extract of broccoli with activated magnesia and with hydrated lime, and Table 2 shows the purification of the corresponding saponified extract with the same adsorbents.

saponification process is very low and the process itself being simple, a considerable saving in adsorbent cost is effected by first saponifying the plant extract. Moreover, since the cost of activated magnesia #2641 is about 50 times that of hydrated lime, while the potency of the magnesia is only 3 to 6 times that of hydrated lime, it is far more economical to use hydrated lime in this process.

A progressive removal of chlorophyll and xanthophyll from carotene extracts can be obtained, as shown in Table 1, by adding increments of adsorbent. In cases where complete removal of all the xanthophyll and chlorophyll is unnecessary, a considerable saving in the quantities of adsorbent used can be secured.

EXAMPLE II

Similarly, 10 pound broccoli extracts were made using Skellysolves B (essentially hexane, B. P. 65° C. to 70° C.) and C (essentially heptane, B. P. 88° C. to 98° C.). With Skellysolve B, a treatment with 1,000 grams of hydrated lime resulted in carotene extract consisting of 64 percent carotene and 36 percent xanthophyll. With Skellysolve C a treatment of 2,000 grams of hydrated lime was necessary to give the same degree of purification. From Table 2, it can be seen that a treatment with 865 grams of hydrated lime in a Skellysolve F extract resulted in a 100 percent carotene extract. Therefore, the efficiency of adsorption from these solvents in decreasing order is Skellysolve F, Skellysolve B, and Skellysolve C. In general terms, adsorption de-

TABLE 1

*Adsorption of impurities from unsaponified plant extract*

| Process | Grams Adsorbent | Carotene Per Cent Total Pigment | Xanthophyll Per Cent Total Pigment | Chlorophyll Per Cent Total Pigment |
|---|---|---|---|---|
| Concentrate | 0 | 13.9 | 17.7 | 68.4 |
| Adsorption #2641 activated magnesia | 865 | 70.5 | 11.4 | 18.1 |
| Do | 2,600 | 100.0 | 0.0 | 0.0 |
| Adsorption Hydrated Lime | 2,600 | 27.8 | 17.5 | 54.7 |
| Do | 5,200 | 57.4 | 7.7 | 34.9 |
| Do | 7,800 | 100.0 | 0.0 | 0.0 |

TABLE 2

*Adsorption of impurities from a saponified plant extract*

| Process | Grams Adsorbent | Carotene Per Cent Total Pigment | Xanthophyll Per Cent Total Pigment | Chlorophyll Per Cent Total Pigment |
|---|---|---|---|---|
| Saponified concentrate | 0 | 52 | 37 | 11 |
| #2641 Magnesia adsorption | 433 | 100.0 | 0.0 | 0.0 |
| Hydrated Lime adsorption | 865 | 100.0 | 0.0 | 0.0 |

From Table 1, it may be seen that complete removal of chlorophyll and xanthophyll from a Skellysolve F extract can be secured with both activated magnesia #2641 and hydrated lime. The separation of chlorophyll and xanthophyll from the carotene requires about 3 times as much hydrated lime as activated magnesia. From Table 2 it can be seen that after saponification much less lime and activated magnesia is required to purify the carotene extract, between 10 percent and 15 percent of the quantity of adsorbent required for the unsaponified extract in both cases.

Since the cost of the chemicals used in the creases as one goes from a low boiling petroleum ether to a high boiling petroleum ether. The same relationships that were observed with hydrated lime and the various petroleum ethers, also hold true for all other adsorbents.

The efficiency of other adsorbents in Skellysolve B extracts can be observed from the results in Table 3, which were obtained by stirring various quantities of adsorbents in the Skellysolve extract. The weight of each adsorbent selected for use in this table was that quantity which would cause the extract to have a carotene percentage closest to that secured with activated magnesia. In this manner an approximation of the relative adsorption efficiencies of the various adsorbents could be secured. From data of this nature the relative adsorption efficiencies of a large number of adsorbents mentioned previously were obtained. The higher the ratio secured, the weaker the adsorbent.

TABLE 3

*Efficiency of various adsorbents in removing chlorophyll and xanthophyll from saponified Skellysolve B extract of broccoli*

| Adsorbent | Grams Adsorbent | Carotene Percent Total Pigment | Ratio of Grams Adsorbent to Grams Activated Magnesia |
|---|---|---|---|
| Activated Magnesia | 200 | 73.6 | 1.0 |
| Hydrated Lime | 1,200 | 67.0 | 6.0 |
| Lime | 1,200 | 66.7 | 6.0 |
| Magnesium Carbonate | 800 | 77.0 | 4.0 |
| Calcium Carbonate | 2,400 | 63.0 | 12.0 |
| Bauxite | 1,200 | 69.0 | 6.0 |

Removal of chlorophyll but not xanthophyll can be secured by adsorption from chlorinated solvents such as trichloroethylene. A saponified trichloroethylene extract which contained 29.8 percent chlorophyll contained only 5.1 percent chlorophyll after treatment with hydrated lime, but the xanthophyll was unaffected by this treatment due to the weak adsorption from trichloroethylene.

Having thus described our invention, we claim:

1. In the process of purifying carotene contaminated with chlorophyll and xanthophyll, the steps comprising forming a petroleum ether solution of the contaminated carotene and treating the solution with hydrated lime to adsorb the contaminants, thence removing the lime from the solution.

2. In the process of purifying carotene contaminated with chlorophyll and xanthophyll, the steps comprising forming a petroleum ether solution of the contaminated carotene, mixing the solution with activated magnesia whereby the chlorophyll and xanthophyll are simultaneously adsorbed on the said activated magnesia, then recovering the carotene solution substantially free of chlorophyll and xanthophyll.

3. In a process of purifying carotene contaminated with chlorophyll and xanthophyll, the step comprising treating a solution thereof in a low boiling hydrocarbon with a solid adsorbent taken from the group consisting of calcium oxide, calcium hydroxide, calcium carbonate, secondary calcium phosphate, secondary magnesium phosphate, magnesium carbonate, magnesium oxide, and oxide of aluminum; whereby the chlorophyll and xanthophyll are removed by adsorption on the adsorbent.

4. In a process of purifying carotene contaminated with chlorophyll and xanthophyll, the step comprising treating a solution thereof in a low boiling hydrocarbon with alumina to adsorb the contaminants, then removing the alumina from the solution.

MONROE E. WALL.
EDWARD G. KELLEY.

REFERENCES CITED

The following references are of record in the file of this patent:

UNITED STATES PATENTS

| Number | Name | Date |
|---|---|---|
| 2,383,561 | Petering et al. | Aug. 28, 1945 |

OTHER REFERENCES

Fraps et al., J. Assoc. Official Agr. Chem. 22, 190–4 (1939) and 23, 422–5, 659–62 (1940).

Kuhn et al., Z. Physiol. Chem. 206, 41–64 (1932) (C. A. 26, 3533).

Rozenberg, Bull. Biol. Med. Exptl. U. S. S. R. 5, 363–4, (1938) (C. A. 33, 2930).

Petering et al., Ind. and Eng. Chem., 32, 1407–12.

Chem. Abs., vol. 38 (1944), 4759, Banchenko "Carotene" Russ. 56, 161, Dec. 31, 1939.

Richter, "Textbook of Organic Chemistry," John Wiley & Sons Inc., New York (1938), page 39.

Fraps et al., Ind. & Eng. Chem., Jan. 15, 1940, pages 16 to 18.